No. 621,376. Patented Mar. 21, 1899.
L. H. SEUBERT.
ANTIFRICTION BEARING.
(Application filed Mar. 7, 1898.)
(No Model.)
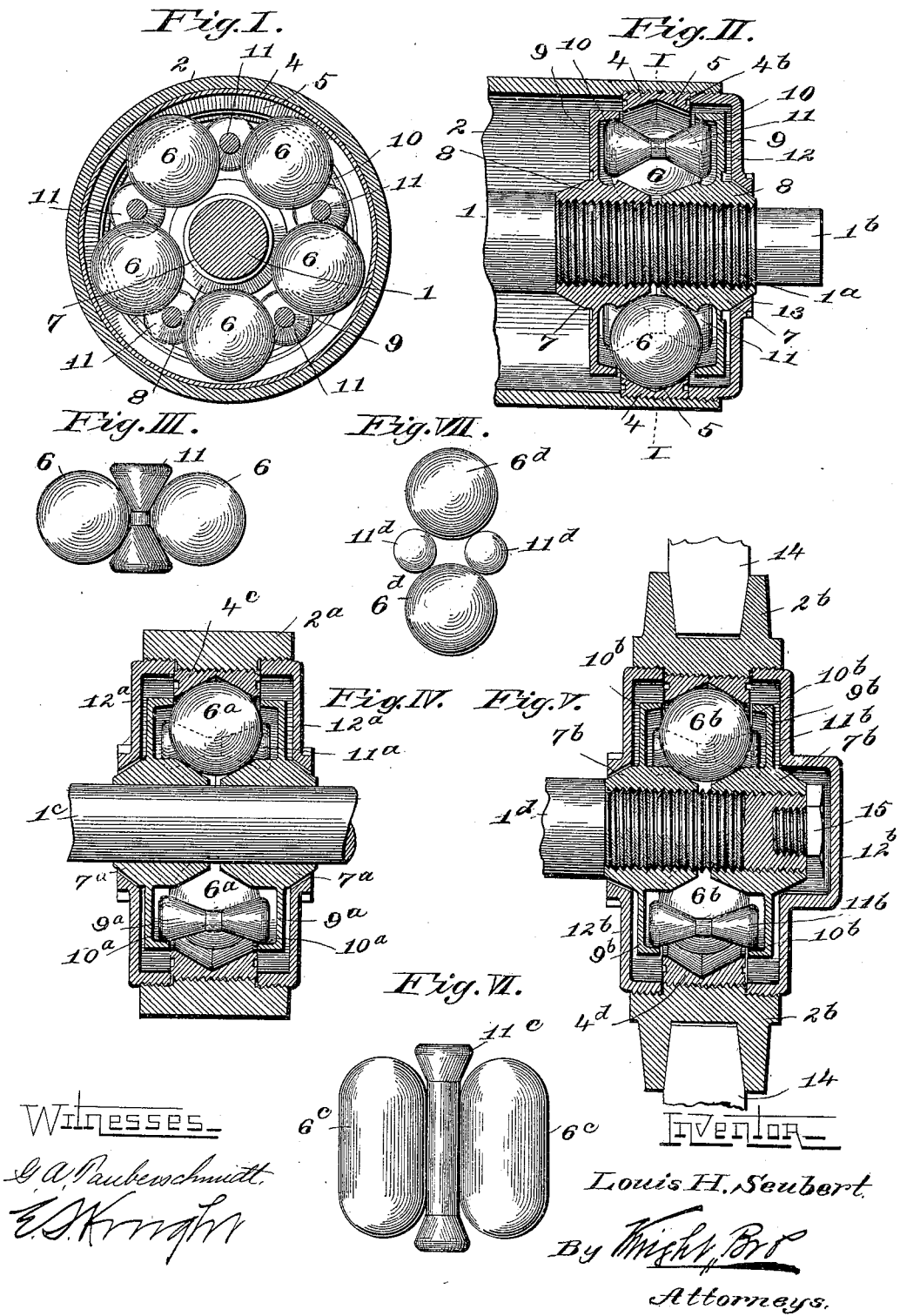
Witnesses
Inventor
Louis H. Seubert
By Wright Bro
Attorneys.

UNITED STATES PATENT OFFICE.

LOUIS H. SEUBERT, OF ST. LOUIS, MISSOURI.

ANTIFRICTION-BEARING.

SPECIFICATION forming part of Letters Patent No. 621,376, dated March 21, 1899.

Application filed March 7, 1898. Serial No. 672,972. (No model.)

*To all whom it may concern:*

Be it known that I, LOUIS H. SEUBERT, a citizen of the United States, residing at the city of St. Louis, in the State of Missouri, have invented a certain new and useful Improvement in Antifriction-Bearings, of which the following is a full, clear, and exact description, reference being had to the accompanying drawings, forming part of this specification.
My invention relates to that class of roller-bearing in which spherical or elongated main rollers and double-cone rollers are used, the object of the invention being to so construct such a bearing that the bearing-surfaces are reduced to a minimum and the rollers are so supported and arranged as to turn with the greatest possible ease and to roll freely throughout instead of grinding one against another.
My invention consists in features of novelty hereinafter fully described, and pointed out in the claims.

Figure I is a cross-sectional view taken on the line I I, Fig. II, the bearing-rollers being shown in elevation and the central portions of the intermediate rollers being shown in cross-section. Fig. II is a longitudinal sectional view of the bearing with the main and intermediate rollers and shaft shown in elevation. Fig. III is a detail view of two of the bearing-rollers and one of the intermediate rollers, illustrating the points of contact of the parts. Fig. IV is a sectional view similar to that shown in Fig. II of the bearing in a form used for machinery-shafting. Fig. V is a sectional view similar to that shown in Fig. II of the bearing in a form used for vehicle-wheels. Fig. VI is a detail view showing elongated main rollers for a roller-bearing. Fig. VII is a detail view showing rollers for a spherical-roller bearing.

1 designates the bearing-shaft, and 2 the housing. The shaft may be the axle of a wheel, such as a bicycle, or it may be the crank-shaft of a vehicle or machine, such as a bicycle. Likewise the housing 2 may be the hub of a wheel or the hanger in which the shaft is mounted. In one instance the housing would turn around the shaft and in the other instance the shaft would turn within the housing. The housing 2 is provided with an internal screw-thread 3.

4 is a ring having its periphery provided with a screw-thread to fit the screw-thread 3 on the interior of the housing. The ring 4 is preferably formed with inner inclined faces 5, that extend toward each other to a common center and form a V-shaped channel for the bearing-rollers. This ring is provided with recesses $4^b$ in its side faces, adapted to receive the prongs of a spanner or other implement by means of which the ring may be turned into position in the housing 2.

The ring 4 is preferably made of one piece; but it may be a divided ring and consist of two pieces having the opposing inclines. The main purpose of the ring 4 is to prevent the end thrust of the bearing-rollers, and instead of using a ring having two inclined faces a ring having a single inclined face may be used, and a ring having a single inclined face opposing that of the first may be used in an opposing bearing in order to overcome the end thrust in both directions.

6 designates spherical main rollers arranged in the V-shaped channel formed by the inclined faces, but which, by virtue of said inclined faces having straight inclines, contact with but the least possible portions of the faces and affords small rolling frictional contact and consequently a limited degree of resistance to the free turning of the main rollers.

The bearing-shaft 1 is provided with a screw-thread $1^a$. On the shaft are a pair of cone members having screw-threaded central portions 7, that fit the screw-thread $1^a$ of the bearing-shaft. The portions 7 of the cone members each have inwardly-tapering inner faces, in contact with which the main rollers 6 travel, said tapering faces forming a channel for the main rollers similar to that formed by the inner faces of the ring 4. At the outer ends of the cone-member portions are outwardly-tapering faces 8.

Each cone member 7 carries a surrounding disk 9, having an inwardly-projecting flange-rim 10, the inner face of which is tapered, the flange-rims of the two cone members opposing each other. Each cone member is provided with suitable recesses for the reception of an implement by which they are turned onto the shaft 1 to adjust them on the shaft.

11 designates double-cone rollers arranged intermediate of the main rollers 6 to separate them and also to distribute and equalize the slack between the main rollers. These intermediate rollers are in the form of double cones, so that they taper inwardly from each end. By reason of the intermediate rollers being tapered, as stated, the main rollers bear against but limited portions of them, and consequently less rolling frictional contact exists between the main and intermediate rollers. The outer ends of the rollers 11 ride against or on the flange-rims 10 of the cone members 7, such rims forming tracks for the rollers 11, and travel with and partake of the axle or shaft movement.

The cone members 7 are preferably alike in all particulars and are consequently interchangeable.

12 designates a cap that fits in the outer end of the housing 2 to inclose the parts of the bearing and prevent the ingress of dust or dirt. This cap is connected to the bearing-housing by a peripheral screw-thread that engages the internal screw-thread in the housing. The cap is provided with a central aperture 13, which is tapered to correspond to the tapered face of the outer end of the outer cone member, which arrangement enables the formation of a close joint without the aid of washers that will not permit the entrance of dust or dirt into the bearing. The cap is provided with a wrench or spanner seat to permit of its being engaged to turn it as tightly against the cone member as may be desired. In this connection it may be stated that by tightening the cap 12 onto the central portion of the outer cone member to a sufficient extent it is possible to so clamp the bearing-shaft and housing together as to render the parts rigid and prevent the action of the bearing, thereby locking it. As seen in Fig. II, the end $1^b$ of the bearing-shaft is adapted to receive the crank of a bicycle, and when a crank is placed thereon it may fit against the outer end of the outer cone member 7, and there is intended to be sufficient space between the crank and the cap 12 for the insertion of an implement to turn the cap.

In the practical use of my improved bearing the parts are arranged upon the shaft and in the housing, as shown in Fig. II. To obtain the desired or proper adjustment of the bearing and intermediate rollers, the inner cone member being moved into its innermost position, the outer cone member is moved toward the inner one for the purpose of adjusting the bearing and intermediate rollers and take up the slack between them. The flange-rims 10, carried by the cone members and forming tracks for the intermediate rollers 11, provide for the adjustment of said rollers 11 between the main rollers 6, so that the rollers 6 may be adjusted to a nicety and only the desired amount of slack be left between them and the intermediate rollers. The adjustment of the cone members causes changes in the position of the main rollers 6 by reason of the inner inclined faces 8 of the cone members at the same time that it causes adjustment of the intermediate rollers through the medium of the flange-rims 10. In the operation of the bearing the intermediate rollers 11 are carried around by the flange-rims 10, which form tracks for said rollers, and these rollers consequently travel in the same direction with the shaft 1 by reason of said flange-rims having direct connection with said shaft owing to their being carried by the cone members. The main rollers 6 travel in an opposite direction to the intermediate rollers 11 by reason of their bearing contact with the cone members 7 and the intermediate rollers. In the movement of the parts it will be readily observed that by the arrangement set forth the flange-rims 10 effect a pull on the intermediate rollers at their points of contact and the intermediate rollers effect a pull on the main rollers 6, while the cone members effect a push on the opposite portions of the main rollers 6, and consequently there is a double action on the main rollers 6, that causes them to be turned much more readily and to turn freely without grinding or slipping. In my bearing there is an absolute certainty of the main rollers all turning freely, as every one is operated upon by the intermediate rollers in addition to their bearing against the inner faces of the cone members, and the intermediate rollers being operated through the flange-rims having direct contact with the bearing-shaft such intermediate rollers are compelled to roll continuously and there is no grinding or slipping as in other forms of roller-bearings. It will be observed that there is no direct bearing of any other parts upon the intermediate rollers 11, and these rollers do not sustain any weight in the operation of the bearing, as all of the weight or load is borne by the main rollers 6, which contact with the other weight-sustaining portions of the bearing.

An important advantage involved in the construction of my bearing lies in the fact that owing to the main rollers of the bearing being compelled to roll by reason of the arrangements of the parts it is impossible for any sudden jolt or jar to the bearing causing the main rollers to stick, slide, or grind, as is the case with other forms of bearings.

The bearing shown in Fig. IV is of a form designed for use upon machinery-shafting. The shaft in this form is designated by $1^c$, and as a whole the parts of the bearing are substantially the same as those described in connection with Figs. I and II, with the exception that two caps $12^a$ are used, one at each end of the bearing. The remaining parts of the bearing are designated by like numerals with lower-case affix-letter "a," except for the ring $4^c$.

In Fig. V, I have shown the bearing applied to a vehicle-wheel, in which the housing $2^b$ constitutes the hub of the wheel and receives the spokes 14. The shaft $1^d$ is provided at its outer end with a jam-screw 15 set therein, that bears against the outer cone member $7^b$. $4^d$ designates the ring carried by the housing. The remaining parts are similar to those previously described and are designated by like numerals with lower-case affix-letter "b."

In Fig. VI, I have shown elongated rollers $6^c$ in place of the main rollers 6 and the intermediate rollers $11^c$ elongated, so that the rollers $6^c$ bear against the central portions of said intermediate rollers instead of the conical parts thereof. In this case the inner contact-face of the ring 4 would be widened to conform to the elongated rollers, so that the bearing on the ring is produced in the same manner as against the intermediate rollers. This form of roller is particularly intended for use where the bearing is subjected to heavy loads and great strain.

In Fig. VII the spherical main rollers $6^d$ are separated by intermediate smaller spherical rollers $11^d$, that take the place of the rollers 11. The operation in this instance is the same as where the intermediate rollers are used. This form would be in many cases desirable.

All parts that effect the working of the bearing are mathematically calculated so as to be of the proper proportion to roll smoothly without any slipping or sliding, consequently doing away with all friction excepting natural rolling friction, this having also been reduced to the minimum.

I claim as my invention—

1. The combination of a housing, a shaft, cone members providing an annular roller-channel, having disks formed with flanges and mounted on said shaft, a ring secured rigidly within the housing, said ring being provided with a roller-channel, a series of main rollers working in the channels, and a series of intermediate rollers working between the main rollers and on the flanges; substantially as described.

2. In an antifriction-bearing, the combination of a shaft, a housing, a ring mounted in said housing, said ring having opposing inclined faces forming a trough-like channel, a pair of opposing cone members having inclined faces, said cone members carrying disks provided with inwardly-projecting track-rims, a series of rollers arranged between said cone members and said ring, and a series of rollers arranged intermediate of the first-named series of rollers; substantially as described.

3. The combination of a shaft, a cone member having an outer tapering face and carried by said shaft, a housing, an adjustable cap secured within the housing and having an outwardly-tapering central aperture fitting the tapering face of the cone member; substantially as described.

4. In an antifriction-bearing, the combination of a shaft, a pair of cone members carried by said shaft, the outer one of said cone members being provided with a tapering face, a housing, a cap secured in said housing and provided with a central tapering aperture, a ring mounted in said housing, said ring having opposing inclined faces, a series of rollers arranged between said cone members and said ring, and a series of rollers arranged intermediate of the first-named series of rollers; substantially as described.

5. In an antifriction-bearing, the combination of a shaft, a housing containing roller-receiving channels, two series of rollers, a pair of adjustable cone members carried by said shaft, said cone members carrying track-rims for one series of said rollers; substantially as described.

6. In an antifriction-bearing, the combination of a shaft, a housing containing roller-receiving channels, two series of rollers, a pair of adjustable cone members carried by said shaft, said cone members carrying track-rims for one series of said rollers, said track-rims being formed with inclined bearing-surfaces whereby on their adjustment the series of rollers in contact therewith are moved to govern the slack between the rollers of the other series; substantially as described.

7. In an antifriction-bearing, the combination of a housing containing roller-receiving channels, a shaft, two series of rollers, and a pair of track-rims mounted in said housing and arranged to receive the travel of one of said series of rollers; substantially as described.

LOUIS H. SEUBERT.

In presence of—
E. S. KNIGHT,
N. V. ALEXANDER.